(12) United States Patent
Bilik et al.

(10) Patent No.: US 10,539,672 B2
(45) Date of Patent: Jan. 21, 2020

(54) DOPPLER AMBIGUITY RESOLUTION AT HIGH SIGNAL TO NOISE RATIO

(71) Applicant: GM GLOBAL TECHNOLOGY OPERATIONS LLC, Detroit, MI (US)

(72) Inventors: Igal Bilik, Rehovot (IL); Alexander Pokrass, Bat Yam (IL); Moshe Laifenfeld, Haifa (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 521 days.

(21) Appl. No.: 15/374,210

(22) Filed: Dec. 9, 2016

(65) Prior Publication Data

US 2018/0164422 A1    Jun. 14, 2018

(51) Int. Cl.
*G01S 13/60* (2006.01)
*G01S 7/40* (2006.01)
*G01S 13/93* (2006.01)
*G05D 1/02* (2006.01)

(52) U.S. Cl.
CPC ............ *G01S 13/60* (2013.01); *G01S 7/4021* (2013.01); *G01S 13/931* (2013.01); *G05D 1/0257* (2013.01)

(58) Field of Classification Search
CPC ........ G01S 13/60; G01S 7/354; G01S 7/4021; G01S 13/343; G01S 13/931; G01S 7/2922; G01S 7/415; G01S 2007/2883; G01S 2007/356; G01S 2013/9375; G05D 1/0257
USPC .......................................................... 342/98
See application file for complete search history.

(56) References Cited

U.S. PATENT DOCUMENTS

| | | | | | |
|---|---|---|---|---|---|
| 3,733,581 | A | * | 5/1973 | Kalmus | G01S 15/523 367/94 |
| 3,750,172 | A | * | 7/1973 | Tresselt | G01S 13/348 342/129 |
| 4,003,054 | A | * | 1/1977 | Goldstone | G01S 7/4021 342/174 |
| 4,065,768 | A | * | 12/1977 | Kondoh | G01S 7/036 342/61 |
| 4,568,939 | A | * | 2/1986 | Grau | G01S 13/5242 342/104 |
| 5,247,303 | A | * | 9/1993 | Cornelius | G01S 13/20 342/26 D |
| 5,252,980 | A | * | 10/1993 | Gray | G01S 13/003 342/107 |

(Continued)

*Primary Examiner* — Vladimir Magloire
*Assistant Examiner* — Nuzhat Pervin
(74) *Attorney, Agent, or Firm* — Cantor Colburn LLP

(57) ABSTRACT

A system and method of determining a relative velocity of an object at a radar system is disclosed. A transmitter transmits a source signal at the object and a receiver receives an echo signal that is a reflection of the source signal from the object. The echo signal is partitioned into a first portion and a second portion at a processor. A first Doppler frequency is estimated for the first portion and a second Doppler frequency is estimated for the portion. A difference is estimated between the first Doppler frequency and the second Doppler frequency. A presence of a Doppler ambiguity is determined from a comparison of the estimated difference to a selected Doppler frequency. A corrected Doppler frequency is obtained based on the Doppler ambiguity and the relative velocity of the object is determined from the corrected Doppler frequency.

18 Claims, 5 Drawing Sheets

(56) References Cited

U.S. PATENT DOCUMENTS

| | | | | |
|---|---|---|---|---|
| 5,442,359 A * | 8/1995 | Rubin | ............. | G01S 13/30 |
| | | | | 342/109 |
| 6,078,281 A * | 6/2000 | Milkovich | ......... | G01S 7/2925 |
| | | | | 342/162 |
| 7,474,258 B1 * | 1/2009 | Arikan | ............. | G01S 7/292 |
| | | | | 342/107 |
| 8,823,578 B2 * | 9/2014 | Hattori | ............. | G01S 15/10 |
| | | | | 340/901 |
| 10,145,954 B2 * | 12/2018 | Davis | ............. | G01S 13/931 |
| 2006/0079749 A1 * | 4/2006 | Hurst | ............. | G01S 7/354 |
| | | | | 600/407 |
| 2012/0056775 A1 * | 3/2012 | Weiss | ............. | G01S 7/2923 |
| | | | | 342/139 |
| 2013/0069818 A1 * | 3/2013 | Shirakawa | ......... | G01S 13/347 |
| | | | | 342/146 |
| 2015/0084806 A1 * | 3/2015 | Rohling | ............. | G01S 13/345 |
| | | | | 342/109 |
| 2015/0355322 A1 * | 12/2015 | Oshima | ............. | G01S 13/003 |
| | | | | 342/116 |

* cited by examiner

DOPPLER AMBIGUITY RESOLUTION AT HIGH SIGNAL TO NOISE RATIO

FIELD OF THE INVENTION

The subject invention relates to a system and method of determining relative velocity of an object using radar and, in particular, for resolving Doppler ambiguity that occurs in velocity measurements obtained using modulated signals in radar systems.

BACKGROUND

Recent automobiles and vehicles have been built with on-board safety systems which include radar technologies for detecting a velocity of an object with respect to the vehicle so that a driver or collision-avoidance device can react accordingly. In one such technology, the Doppler effect is used to determine a relative velocity between the vehicle and the object. A transmitter at the vehicle transmits a modulated source signal, such as a chirp signal, towards the object at a selected frequency. The modulated source signal reflects off of the object and is received by a receiver at the vehicle. A frequency difference (known as the "Doppler frequency") between the frequency of the source signal and the frequency of the reflected signal provides information about the relative velocity of the object with respect to the vehicle.

The frequency of the reflected signal is determined by sampling the reflected signal at a selected sampling rate and performing a Fast Fourier Transform (FFT) on the sampled signal to generate a frequency space that includes a representative peak. When the Doppler frequency is greater than a sampling frequency of the radar system, aliased frequencies appear in the frequency space, producing what is known as Doppler ambiguity. Doppler ambiguity can be resolved by lengthening the duration of the chirp signal in order to introduce additional (higher) Doppler sampling frequencies. However, this method requires additional control and processing and a corresponding increase in overhead and time expense. Accordingly, it is desirable to provide a method for resolving Doppler ambiguity using existing radar systems.

SUMMARY OF THE INVENTION

In one exemplary embodiment of the invention, a method of determining a relative velocity of an object at a radar system is disclosed. The method includes: receiving an echo signal at a receiver that is a reflection of a source signal from the object; partitioning the echo signal into a first portion and a second portion; estimating a first Doppler frequency for the first portion and a second Doppler frequency for the time portion; estimating a difference between the first Doppler frequency and the second Doppler frequency; determining a presence of Doppler ambiguity from a comparison of the estimated difference to a selected Doppler frequency; obtain a corrected Doppler frequency based on the Doppler ambiguity; and determining the relative velocity of the object from the corrected Doppler frequency.

In another exemplary embodiment of the invention, a system for determining a relative velocity of an object is disclosed. The system includes: a transmitter for transmitting a source signal at the object; a receiver that receives an echo signal that is a reflection of the source signal from the object; a processor configured to: partition the echo signal into a first portion and a second portion, estimate a first Doppler frequency for the first portion and a second Doppler frequency for the second portion, estimate a difference between the first Doppler frequency and the second Doppler frequency, determine a presence of Doppler ambiguity from a comparison of the estimated difference and a selected Doppler frequency, obtain a corrected Doppler frequency based on the Doppler ambiguity, and determine the relative velocity of the object from the corrected Doppler frequency.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
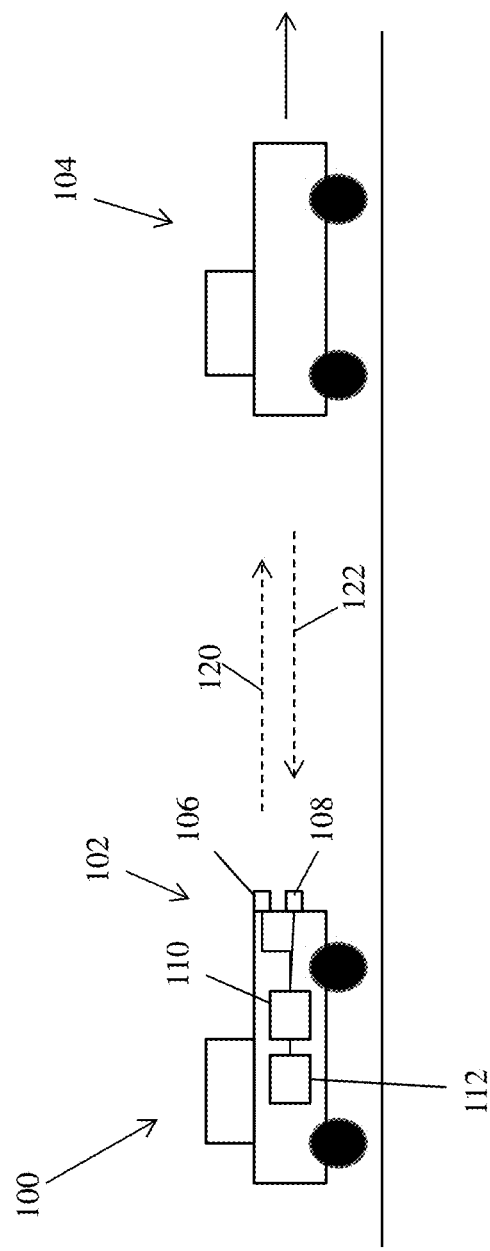
FIG. 1 shows a vehicle that includes a radar system suitable for determining relative velocity of an object or target with respect to the vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the invention, FIG. 1 shows a vehicle 100, such as an automobile, that includes a radar system 102 suitable for determining relative velocity of a target or object 104 with respect to the vehicle 100. In the embodiment shown in FIG. 1, the radar system 102 includes a transmitter 106 and a receiver 108. In alternate embodiments, the radar system 102 may be a MIMO (multi-input, multi-output) radar system that includes an array of transmitters and an array of receivers. A control unit 110 including a processor on-board the vehicle 100 controls and operates the transmitter 106 to generate a radio frequency wave (a "source signal" 120). In one embodiment, the source signal 120 includes a linear frequency-modulated continuous wave (LFM-CW), often referred to as a chirp signal. Alternatively, the source signal 120 can be a pulsed signal or a combination of pulsed and chirp signals. A reflection of the source signal 120 from the object 104 is referred to herein as an echo signal 122. The echo signal 122 is received at the receiver 108, which generally includes circuitry for sampling the echo signal 122. The control unit 110 performs a Fast Fourier Transform (FFT) on the sampled signal to obtain frequencies in a frequency space in order to determine a frequency of the echo signal 122 and thus the Doppler frequency. The Doppler frequency is used to estimate the relative velocity of the object 104 with respect to the vehicle 100.

Knowledge of the relative velocity of the object 104 with respect to the vehicle 100 can then be used to maneuver the vehicle 100 by, for example, accelerating or decelerating the vehicle 100 or steering the vehicle to avoid the object 104. In one embodiment, the control unit 110 cooperates with a collision-avoidance system 112 to control steering and acceleration/deceleration components to perform necessary maneuvers at the vehicle 100 to avoid the object 104. In another embodiment, the control unit 110 provides a signal to alert a driver of the vehicle 100 so that the driver can take necessary actions to avoid the object 104.

While the radar system 102 is discussed herein as being on-board a vehicle 100, the radar system 102 may also be part of an immobile or stationary object in alternate embodiments. Similarly, the object 104 can be a vehicle or moving object or it can be an immobile or stationary object.

The Doppler frequency obtained by the FFT can be used to determine relative velocity of the object up to a maximum velocity indicated by a sampling frequency of the radar system. When the relative velocity exceeds this maximum velocity, the sampling process produces frequency aliasing, in which peaks are produced in frequency space at frequencies different than the actual frequency of the echo signal 122. These aliased peaks produce Doppler ambiguity which can be problematic when estimating the relative velocity of the object 104.

As an example of Doppler ambiguity, an illustrative chirp signal increases linearly from about $f_0$=77 Gigahertz (GHz) to about $f_1$=81 GHz during the chirp duration T, so that the bandwidth ($f_1-f_0$) is about 4 GHz. The Doppler frequency increases with the frequency of the chirp signal. For an object traveling at 36 kilometers per hour with respect to the vehicle 100, a Doppler frequency related to the chirp signal varies from about 5.1 kiloHertz (kHz) (for $f_0$=77 GHz) to about 5.4 kHz (for $f_1$=81 GHz). The difference between these Doppler frequencies is about 5%. However, when sampling the echo signals 122 at a Nyquist sampling frequency of 1.5 kHz, these resultant Doppler frequencies of 5.1 kHz and 5.4 kHz are aliased to 0.6 kHz and 0.9 kHz, respectively. The difference between these aliased frequencies (0.6 kHz and 0.9 kHz) is about 50%, which is much greater than the difference between the original Doppler frequencies. The methods disclosed herein resolves the Doppler ambiguity resulting from this aliasing process by determining a degree by which Doppler frequency varies across the bandwidth of the source signal.

Figure 2:
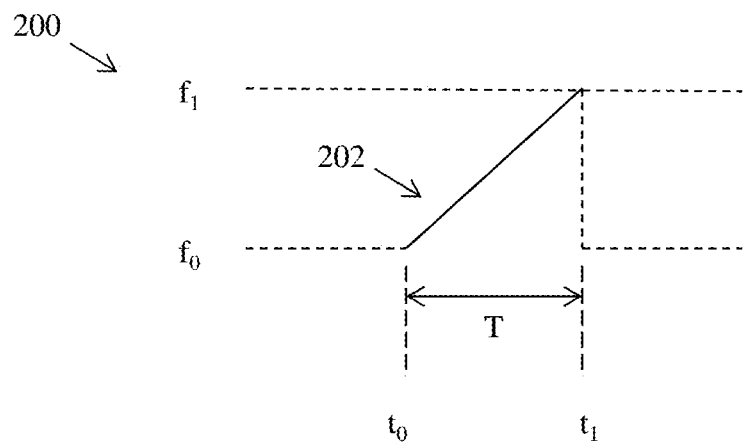
FIG. 2 shows a graph illustrating a frequency response for a chirp signal used as a source signal in one embodiment of the invention.

FIG. 2 shows a graph 200 illustrating a frequency response 202 for a chirp signal used as a source signal 120 in one embodiment of the invention. The frequency response 202 of the chirp signal increases linearly over a selected frequency range for a duration T of the chirp signal, starting at time $t_0$ and ending at time $t_1$. The frequency is given by $f(t)=f_0+kt$, where $f_0$ is the starting frequency (at time $t_0$) and k is the rate of frequency increase or chirp rate, given by $k=(f_1-f_0)/T$. The chirp signal can be repeated a plurality of times at a selected pulse repetition frequency during a transmission mode of the radar system 102.

Figure 3:
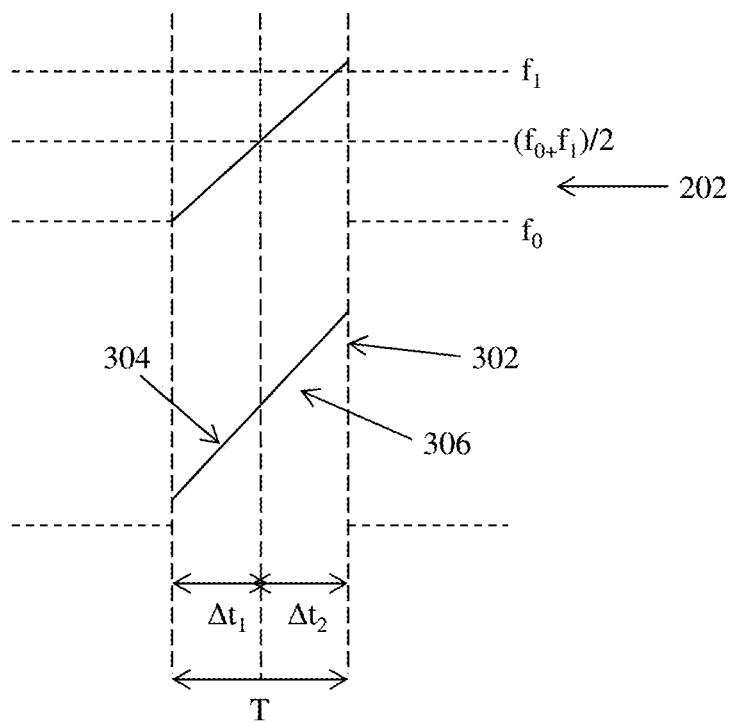
FIG. 3 shows a graph of frequency responses for the chirp signal of FIG. 2 and a corresponding echo signal.

FIG. 3 shows a graph 300 of frequency responses 202 and 302 for the transmitted chirp signal of FIG. 2 and a corresponding received echo signal 122 (FIG. 1), respectively. Although the echo signal 122 generally follows the chirp signal by a time delay, the frequency responses 202 and 302 have been time-shifted to align with each other in order to show how their frequencies correspond. The frequency response 202 varies linearly over the range from $f_0$ to $f_1$. The time duration T of the return signal is the same as the time duration T of the original chirp signal.

Methods for resolving Doppler ambiguity are now discussed, beginning in reference to FIG. 3. In accordance with the invention, resolving Doppler ambiguity involves partitioning the echo signal to obtain portions, separately determining Doppler frequency for each portion and observing how the separate Doppler frequencies differ. In FIG. 3, the echo signal is divided in half at the midpoint of the time period T to produce a first portion 304 a second portion 306. The first portion 304 (occurring during time duration $\Delta t_1$) is in response to frequencies of the chirp signal that are between $f_0$ and $(f_0+f_1)/2$. The second portion 306 (occurring during the time portion $\Delta t_2$) is in response to frequencies of the chirp signal that are between $(f_0+f_1)/2$ and $f_1$.

Figure 4:
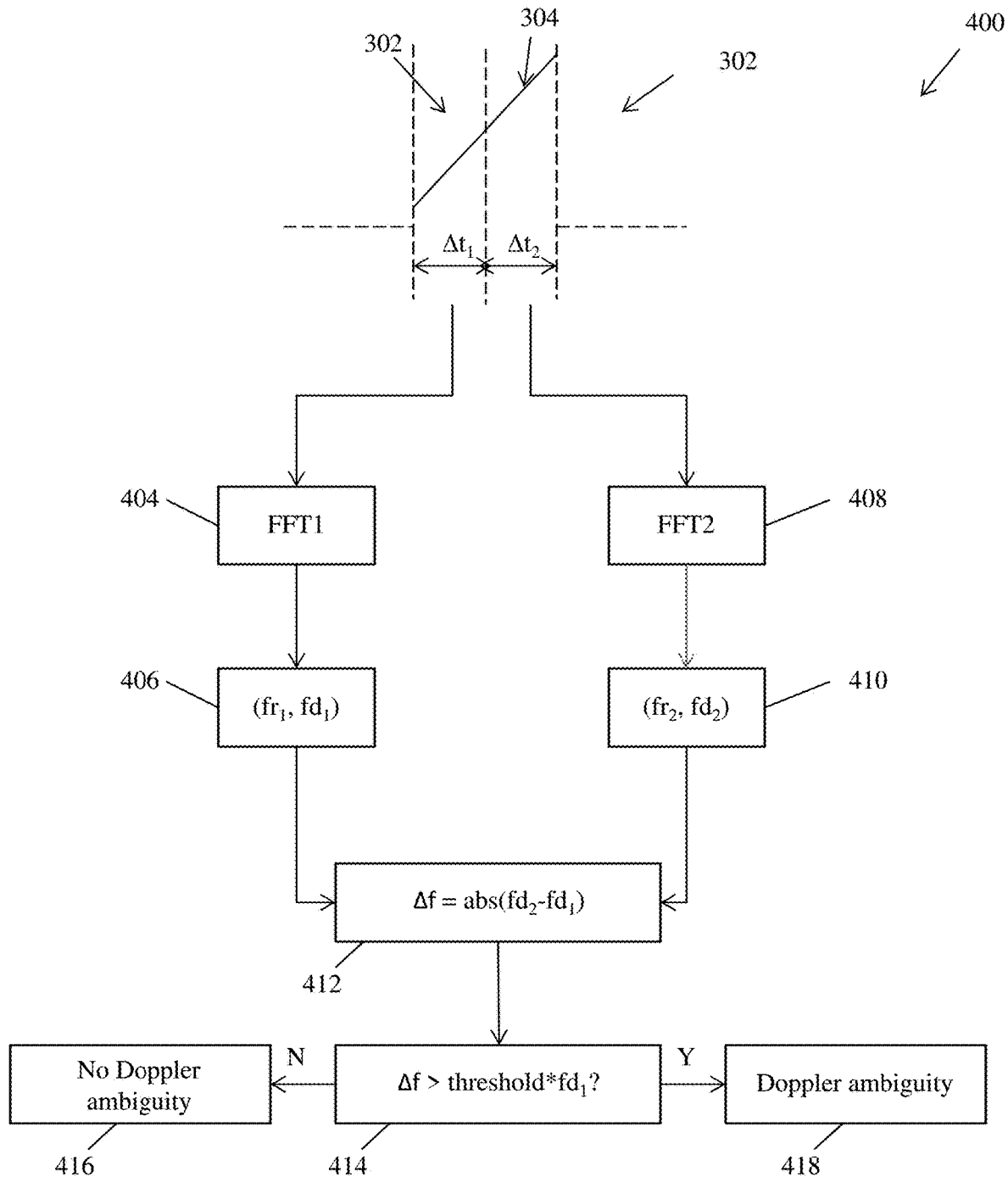
FIG. 4 shows a flowchart schematically illustrating a method for resolving Doppler ambiguity.

FIG. 4 shows a flowchart 400 schematically illustrating a method for resolving Doppler ambiguity occurring in an echo signal in response to a chirp signal from a moving object. The frequency response 302 of FIG. 3 is shown with first portion 304 and second portion 306. In the method disclosed herein, the first portion 304 is recorded and sampled and a first FFT ("FFT1") (Box 404) is performed on the sampled first portion 304 to produce a first frequency space. In Box 406, a frequency ($f_{r1}$) for the first portion 304 and a Doppler frequency ($f_{d1}$) for the first portion 304 are determined. The second portion 306 is recorded and sampled and a second FFT ("FFT2") (Box 408) is performed on the sampled signal to produce a second frequency space. In Box 410, a frequency ($f_{r2}$) for the second portion 306 and a Doppler frequency ($f_{d2}$) for the second portion 306 are determined.

In Box 412, a difference $\Delta f=abs(f_{d2}-f_{d1})$ is calculated between the separate Doppler frequencies $f_{d1}$ and $f_{d2}$. In Box 414, the difference $\Delta f$ in Doppler frequencies is compared to a selected Doppler frequency to determine whether Doppler ambiguity is present or not. In one embodiment, the difference $\Delta f$ is compared to the first Doppler frequency ($f_{d1}$) as shown in Eq. (1):

$$\Delta f > (\text{threshold value}) * f_{d1} \qquad \text{Eq. (1)}$$

In one embodiment, the threshold value is about 2.5%. However other threshold values can be used in alternative embodiments. When Eq. (1) is not true, i.e., when the difference in Doppler frequencies is less than or equal to the threshold value multiplied by $f_{d1}$, then it is determined that Doppler ambiguity is not present or is small enough to be considered insignificant (Box 416). When Eq. (1) is true, i.e., when the difference in Doppler frequencies is greater than the threshold value multiplied by $f_{d1}$, then it is determined that the difference in Doppler frequencies is large compared to $f_{d1}$ and thus Doppler ambiguity is present or is significant enough to affect frequency measurements (Box 418).

The magnitude of $\Delta f$ is generally a result of frequency folding (wrap-arounds) in frequency space, which can occur any number of times. The number of times frequency folding occurs can be determined by finding the least integer number for (N-wrap-arounds) for which Eq. (2) is satisfied:

$$\Delta f > (\text{threshold value}) * f_{d1} + (\text{wrap-around frequency}) * (\text{N-wrap-arounds}) \qquad \text{Eq. (2)}$$

wherein the wrap-around frequency is a Nyquist frequency of the radar system. Once (N-wrap-arounds) has been determined, a non-aliased Doppler frequency can be determined and the relative velocity of the object 104 with respect to the vehicle 100 can be determined from the non-aliased Doppler frequency.

Figure 5:
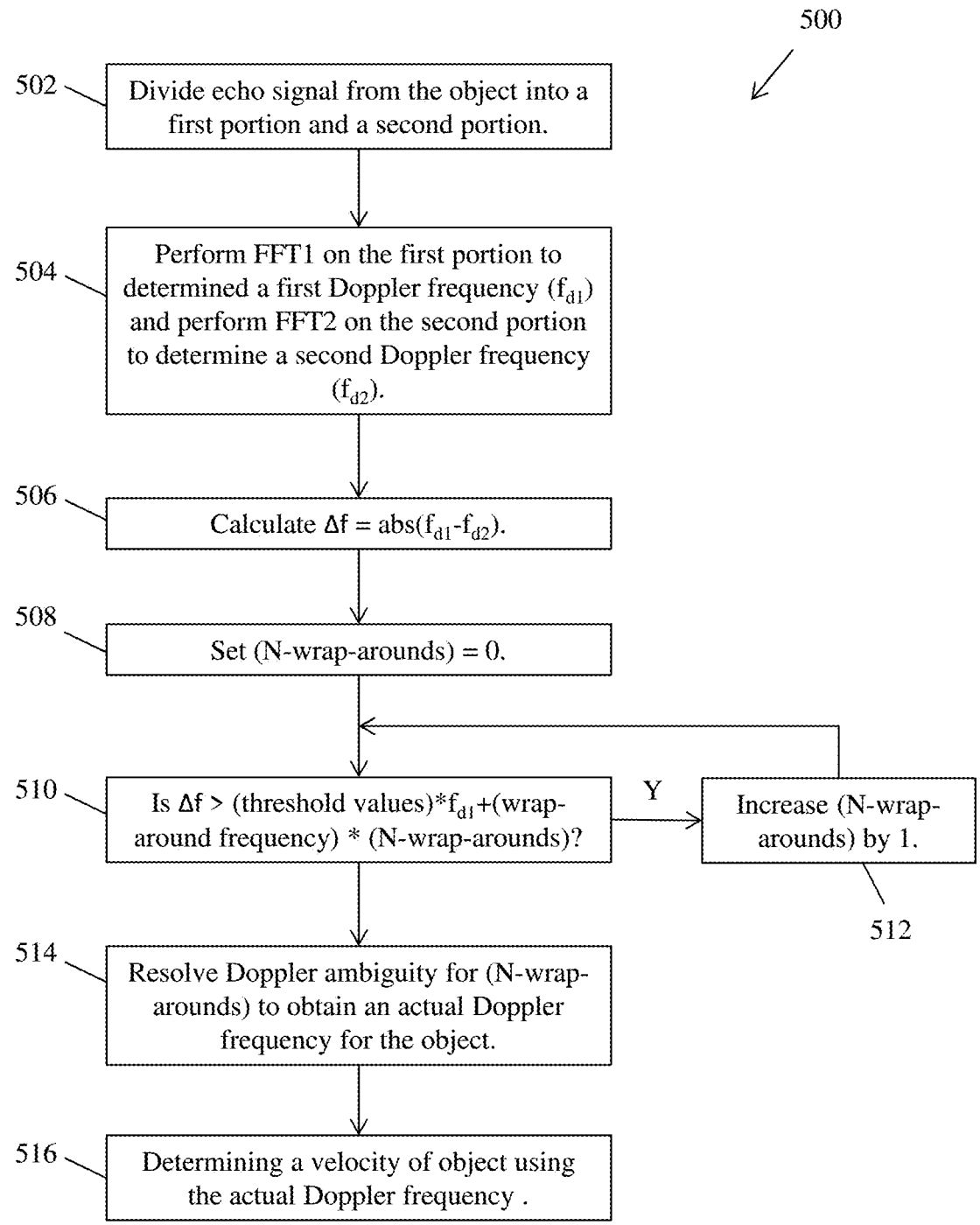
FIG. 5 shows a flowchart illustrating a method for determining a number of wrap-arounds in the frequency space and consequently a relative velocity for object with respect to vehicle.

FIG. 5 shows a flowchart 500 illustrating a method for determining a number of wrap-arounds in the frequency space and consequently a relative velocity for object 104 with respect to vehicle 100. In Box 502, the echo signal 122 obtained from the object 104 is divided into a first portion 304 and a second portion 306, as shown in the frequency response 302 of FIG. 3. In Box 504, a first FFT is performed on the first portion 304 and a second FFT is performed on the second portion 306. A first Doppler frequency ($f_{d1}$) is determined from the first FFT and a second Doppler frequency ($f_{d2}$) is determined from the second FFT. In Box 506, the difference Δf between the first Doppler frequency ($f_{d1}$) and the second Doppler frequency ($f_{d2}$) is calculated. In Box 508, the value of (N-wrap-arounds) is set to zero. In Box 510, the condition of Eq. (1) is checked. If the equation is true, then the method moves to Box 512 in which the value of (N-wrap-arounds) is increased by one and the method is returned to Box 510. Once the Eq. (1) is determined not to be true, then the process moves to Box 514, in which the Doppler ambiguity is resolved for the determined (N-wrap-arounds) of the frequency space to obtain a corrected Doppler frequency for the object 104. The Doppler ambiguity can be resolved by unfolding the frequency space by the determined number of frequency folds i.e., (N-wrap-arounds). In Box 516, a relative velocity of the object 104 is determined based on the corrected Doppler frequency.

Figure 6:
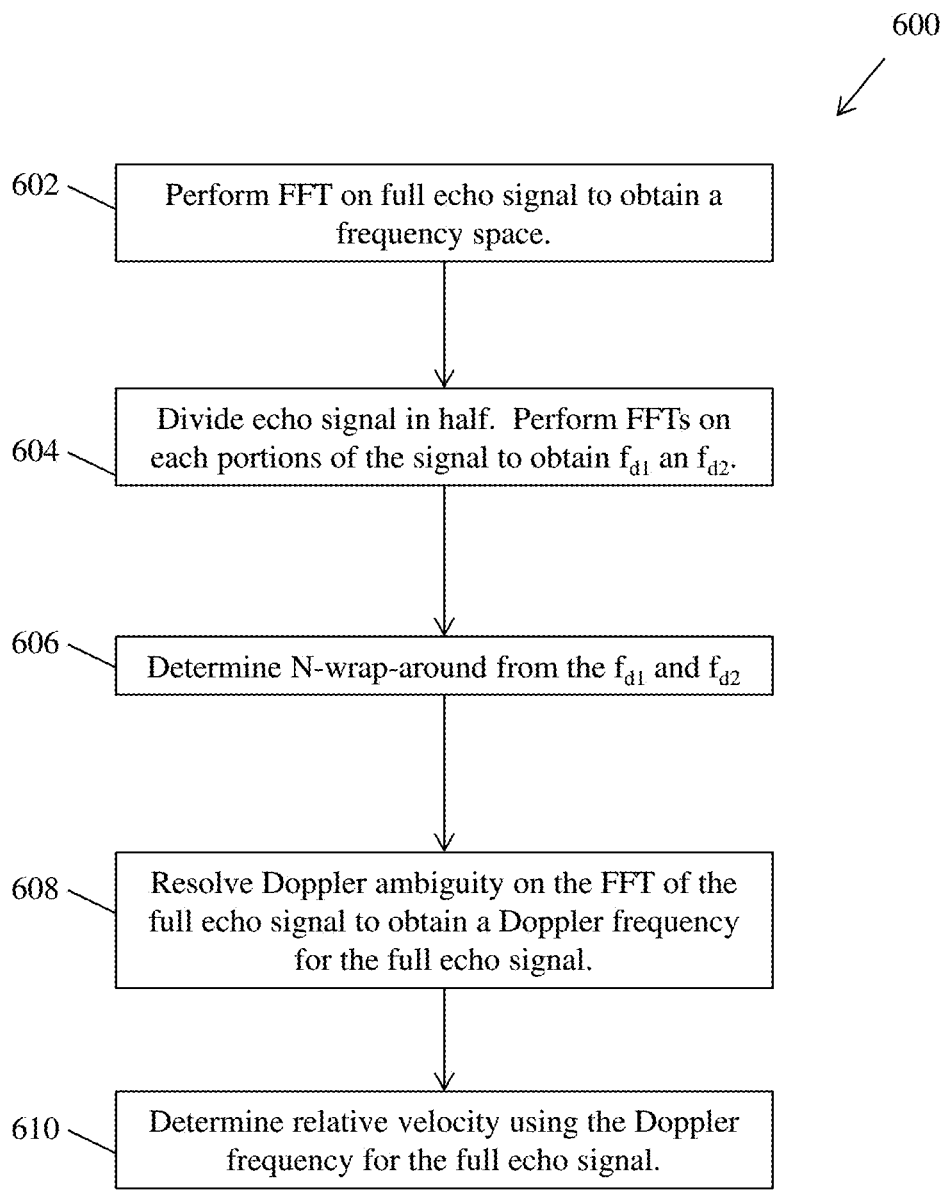
FIG. 6 shows a flowchart for a method of determining a relative velocity of an object with respect to a vehicle in accordance with the invention.

FIG. 6 shows a flowchart 600 for a method of determining a relative velocity of an object 104 with respect to vehicle 100 in accordance with the invention. In a Box 602, an FFT is performed on an entire echo signal (as indicated by frequency response 302) received at the receiver. In a Box 604, the echo signal is divided into a first portion 304 and a second portion 306 and an FFT is performed on each of the first portion 304 and the second portion 306 to obtain two Doppler frequencies, $f_{d1}$ and $f_{d2}$. In Box 606, the Doppler frequencies $f_{d1}$ and $f_{d2}$ are used to determine a value for (N-wrap-around) as described, for example, with respect to FIG. 5. In Box 608, the value of (N-wrap-around) is used to determine the presence of Doppler ambiguity. The value of (N-wrap-around) is used on the frequency space obtained via the FFT for the entire echo signal in order to provide a corrected Doppler frequency for the object 104. The corrected Doppler frequency can be obtained by unfolding the frequency space by the determined number of frequency folds i.e., (N-wrap-arounds). In Box 610, the relative velocity of the object 104 with respect to vehicle 100 is determined using the corrected Doppler frequency obtained from the frequency space of the entire echo signal.

The method disclosed herein improves the ability of a radar system to distinguish the actual relative velocity of an object with respect to the vehicle, including when the relative velocity exceeds a maximum velocity range of the source signal established by a sampling frequency of the radar system. Using corrected Doppler frequencies, the actual relative velocity of the object can be provided to the driver or collision avoidance system in order for the driver or collision avoidance system to have improved reaction in avoiding the object, thus increasing a safety of the driver and vehicle.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of determining a relative velocity of an object at a radar system, comprising:
   receiving an echo signal at a receiver that is a reflection of a source signal from the object;
   partitioning the echo signal into a first portion and a second portion;
   estimating a first Doppler frequency for the first portion and a second Doppler frequency for the second portion;
   estimating a difference between the first Doppler frequency and the second Doppler frequency;
   determining a presence of Doppler ambiguity from a comparison of the estimated difference to a selected threshold multiplied by the first Doppler frequency;
   obtain a corrected Doppler frequency based on the Doppler ambiguity; and
   determining the relative velocity of the object from the corrected Doppler frequency.

2. The method of claim 1, wherein the selected threshold is about 2.5%.

3. The method of claim 1, wherein estimating the first Doppler frequency further comprises performing a Fast Fourier transform (FFT) on the first portion and estimating the second Doppler frequency comprises performing an FFT on the second portion.

4. The method of claim 1, wherein the first portion is in response to a first half of the source signal and the second portion is in response to a second half of the source signal.

5. The method of claim 1, wherein the source signal is a linear frequency-modulated signal.

6. The method of claim 1, further comprising determining a number of frequency folds that produces the Doppler ambiguity and obtaining the corrected Doppler frequency from the number of frequency folds.

7. The method of claim 6, further comprising obtaining the corrected Doppler frequency by unfolding a frequency space by the determined number of frequency folds.

8. The method of claim 7, wherein the frequency space is obtained from an FFT performed on the entire echo signal.

9. The method of claim 1, further comprising receiving the relative velocity of the object at a vehicle and performing a maneuver at the vehicle with respect to the object based on the relative velocity.

10. A system for determining a relative velocity of an object, comprising:
    a transmitter for transmitting a source signal at the object;
    a receiver that receives an echo signal that is a reflection of the source signal from the object;
    a processor configured to:
      partition the echo signal into a first portion and a second portion,
      estimate a first Doppler frequency for the first portion and a second Doppler frequency for the second portion,
      estimate a difference between the first Doppler frequency and the second Doppler frequency,
      determine a presence of Doppler ambiguity from a comparison of the estimated difference to a selected threshold multiplied by the first Doppler frequency,
      obtain a corrected Doppler frequency based on the Doppler ambiguity, and
      determine the relative velocity of the object from the corrected Doppler frequency.

11. The system of claim 10, wherein the selected threshold is about 2.5%.

12. The system of claim 10, wherein the processor is further configured to perform a Fast Fourier transform (FFT) on the first portion to estimate the first Doppler frequency and perform an FFT on the second portion to estimate the second Doppler frequency.

13. The system of claim 10, wherein the first portion is in response to a first half of the source signal and the second portion is in response to a second half of the source signal.

14. The system of claim 10, wherein the source signal is a linear frequency-modulated signal.

15. The system of claim 10, wherein the processor further determines a number of frequency folds that produces the Doppler ambiguity and obtains the corrected Doppler frequency from the number of frequency folds.

16. The system of claim 15, wherein the processor further obtains the corrected Doppler frequency by unfolding a frequency space by the determined amount of frequency folding.

17. The system of claim 16, wherein the frequency space is obtained from an FFT performed on the entire echo signal.

18. The system of claim 10, wherein the processor further maneuvers a vehicle with respect to the object based on the relative velocity.

* * * * *